Sept. 8, 1970  W. G. OHAUS ET AL  3,527,311
BEAM BALANCE HAVING UNITARY GRADIENT AND TARE ADJUSTMENT MEANS
Filed April 12, 1968
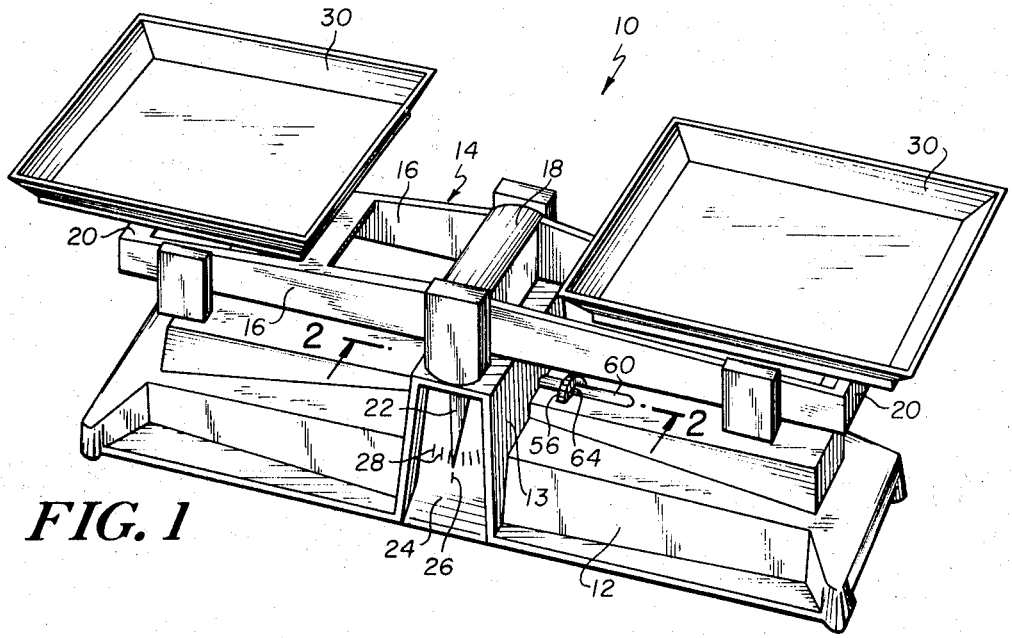
*FIG. 1*
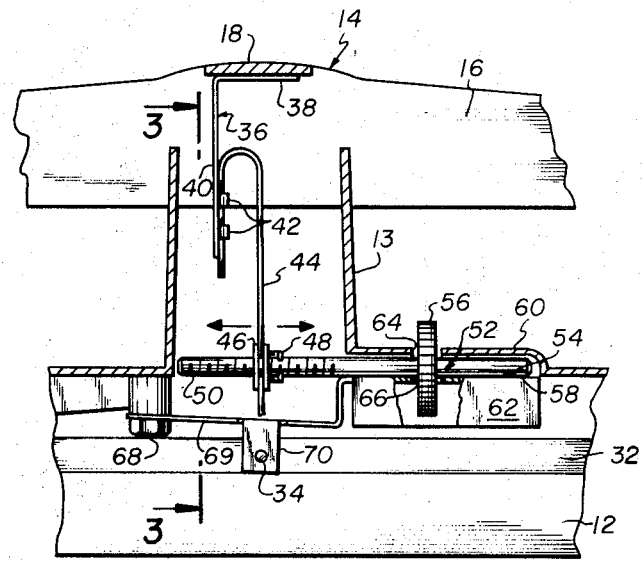
*FIG. 2*  *FIG. 3*
INVENTORS:
WILLIAM G. OHAUS
JOHN H. LANDVATER
BY
*Richards & Cifelli*
ATTORNEYS

United States Patent Office 3,527,311
Patented Sept. 8, 1970

1

3,527,311
BEAM BALANCE HAVING UNITARY GRADIENT AND TARE ADJUSTMENT MEANS
William G. Ohaus, Short Hills, and John H. Landvater, South Berkeley Heights, N.J., assignors to Ohaus Scale Corporation, Union County, N.J., a corporation of New Jersey
Filed Apr. 12, 1968, Ser. No. 720,988
Int. Cl. G01g 23/14, 1/24, 3/08
U.S. Cl. 177—168                        6 Claims

ABSTRACT OF THE DISCLOSURE

A balance for school use has a base including a fulcrum on which is mounted a centrally pivoted balance beam having a weight indicating pointer movable in front of a dial scale. A damping spring wire is firmly secured to the balance beam and adjustably secured to the base for the dual purposes of providing a unitary gradient system and tare adjustment means.

BACKGROUND OF THE INVENTION

This invention relates to a beam balance for school room use and, more particularly, to a balance of this type having a unitary replaceable gradient and tare adjustment means.

Conventional beam balances intended for laboratory use are generally expensive precision instruments manufactured to close tolerances, which are carefully inspected after manufacture to check their balance. Nevertheless, even these instruments are generally not exactly balanced since the amount of initial weight on each side of the center fulcrum pivot is not exactly equal. Therefore, such instruments are always provided with some type of tare adjustment to counteract any imbalance inherent therein which would result in a non-zero reading on the usual scale when no weights, or when equal weights are added to the usual pans. The tare adjustment means most commonly found on these instruments is in the form of internally threaded weights on externally threaded rods. The threaded weights may be moved to secure equilibrium. In school usage a less expensive version of the usual laboratory beam balance is adequate to satisfy most requirements. Since the school balance will be handled by many people, most of whom are at one time unskilled in proper laboratory procedures, the usual threaded weight adjustment means is tedious and not always satisfactory.

In school usage it is often unnecessary to obtain extremely accurate measurements, since the teaching function is paramount. Therefore, it would be desirable to provide a school balance with a suitable gradient means whereby slight non-equilibrium condition between the pans will be indicated by only a small non-zero pointer deviation. It is important that this gradient be controlled so that unnecessarily small deviations in weight will be unnoticable by non-zero pointer position.

SUMMARY OF THE INVENTION

Accordingly, it is the primary objective of the invention to provide a unitary gradient system and a tare adjustment means which is easily adjustable to change the zero balance of the scale and inexpensive to produce.

To accomplish this and other objects in one embodiment, a school balance of the invention is provided which includes a base supporting a fulcrum, a balance beam centrally pivotally supported by the fulcrum, a weight indicating pointer, a dial scale having markings thereon, and a resilient member one end of which is removably fastened to the balance beam and the other end of which is adjustably secured relative to the base. The resilient member serves to control the oscillation of the balance beam and the weight indicating pointer and functions to provide both a unitary gradient and a tare adjustment means.

BRIEF DESCRIPTION OF THE DRAWING

Other objects and further details of that which is novel and comprises the invention will be clear from the following detailed description in conjunction with the accompanying drawing wherein:
FIG. 1 is a perspective view of a school balance;
FIG. 2 is a sectional view taken substantially along line 2—2 of FIG. 1 showing the gradient and tare adjustment means; and
FIG. 3 is a sectional view taken substantially along line 3—3 of FIG. 2.

DESCRIPTION OF THE PREFERRED EMBODIMENT

Referring to the drawing, there is illustrated a school balance generally indicated by the numeral 10 having a base 12 which is in the form of a hollow housing to enclose the delicate elements of the equilibrium system. A fulcrum (not shown) is suitably mounted in the central standard 13 of the base and pivotally supports the center of a balance beam 14. The balance beam is formed with two transversely spaced arms 16 extending parallel to the longitudinal dimension of the base, a central transverse connecting bar 18 and at least two additional transverse connecting bars 20, one at each end of the beam. An indicating pointer 22 depends from the center of the balance beam 14 and is free to swing back and forth in front of a stationary dial plate or chart 24 having a central zero mark 26 and plurality of other marks 28 inscribed on an arc and spaced on each side of the zero mark.

The balance beam 14 supports a weighing pan 30 at each end of the beam; one pan 30 being for known weights and the other for the object to be weighed. The pans are connected to a parallelogram linkage including the balance beam, depending yokes (not shown), and a pair of lower yoke connecting rods 32 pivotally connected at their outer ends to the yokes and at their inner ends to a central pivot pin 34.

The novel gradient and tare adjustment means of this invention which is applied to the above described conventional school balance 10, is located within the hollow central standard 13 of the base 12, as illustrated in FIG. 2. A rigid L-shaped strap 36 is secured to the central transverse connecting bar 18 with its short leg 38 contiguous therewith and its long leg 40 depending therefrom. Two vertically aligned lanced arcuate portions 42 form a channel in the long leg 40 to receive one leg of a J-shaped wire member 44 formed from suitable spring metal. The depending longer leg of the wire member 44 is secured in a spring clamp 46 carried by a movable nut 48 which is in threaded engagement with a threaded portion 50 of a rotatable adjusting shaft 52. The adjusting shaft 52 also includes a shank portion 54 which is provided with a knurled knob 56.

The adjusting shaft 52 is journalled in bearing 58 within which the shank portion 54 may rotate freely and which is formed by an outwardly transversely curved channel portion 60 of the base 12 and a lower planar supporting member 62 upon which the adjusting shaft rests. The base 12 and the supporting member 62 are provided with slots 64 and 66, respectively, to receive the knurled knob on the shaft 54. The lower supporting member 62, which may be in the form of a bent sheet metal element, is suitably secured to the base 12 adjacent the knurled knob at one end and at the other end by means of a suitable screw 68 passing through an extending arm 69. The central pivot pin 34 passes through support legs 70 depending from the arm 69.

The J-shaped spring wire member 44 performs the dual function of providing a unitary gradient and acting as a tare adjustment means. Tare adjustment is accomplished by rotation of the knurled knob 56 which in turn rotates the adjusting shaft 52, causing the threaded nut 48 and the spring clamp 46 to move axially back and forth on the threaded portion of shaft 50. Movement of the spring clamp 46 in which the long leg of the J-shaped wire member 44 is secured causes the wire member to exert a torque on the L-shaped strap 36, and consequently on the balance beam 14 as well. By rotation of the knurled knob 56 in the proper direction, the direction and degree of torque can be adjusted so that pointer 22 will be aligned with the zero mark 26.

The desired gradient is also provided by the action of the resilient member 44. The balance beam 14 is caused to oscillate when weight is added to one of the pans 30, thus causing the J-shaped wire member 44 to flex repeatedly. By proper selection of the flex stiffness or spring constant of the resilient wire forming the member 44, the oscillation of the balance beam 14 may be dampened to the desired degree so that the beam is permitted to move through only a small appropriate angle, in turn permitting the pointer to deviate from the zero mark 26 by just one division on the dial plate when one unit of weight, for example, one gram, is placed on one of the pans 30 to destroy the equilibrium. In this manner, by proper selection of the wire member 44 it is possible to obtain a desired sensitivity of the balance, such that each division of the chart may read one milligram, one gram, or one ounce of weight added to one of the pans, for example, depending on the stiffness of the wire member employed.

Having described this invention of a novel gradient system and tare adjustment means, it will be readily appreciated by those skilled in this art that a school balance embodying this invention is simple in design, low in cost, and especially adapted for the teaching function. The balances of this invention are also highly reliable due to the simple tare adjustment which permits them to be adjusted to zero reading by simple operation of the knurled knob, as often as necessitated by unskilled handling and operation.

It should be understood that the present specific disclosure has been made only by way of example and that numerous changes in details of construction and the combination and arrangement of parts may be resorted to without departing from the spirit and the scope of the invention as hereinafter claimed.

What is claimed is:
1. In a beam balance weighing scale comprising a base, a fulcrum supported by said base, a beam balanced on said fulcrum and free to oscillate thereon, and means indicating the oscillation of said beam with respect to a zero in-balance position on a chart having a plurality of divisions, the improvement which comprises: resilient means connected between said beam and said base, said resilient means exerting a torque on said beam as the beam oscillates, said torque acting to dampen said oscillations and return said beam to said zero in-balance position, wherein said resilient means is adjustably, movably secured relative to said base whereby, by adjustment of the point at which said resilient means is secured relative to said base the torque applied to said beam is altered, thus permitting tare adjustment of said indicating means to said zero in-balance condition.

2. A beam balance weighing scale according to claim 1, wherein said resilient means has flex characteristics such that on oscillation of said beam under the influence of the torque applied to said beam by an imbalance of one unit of weight, the counterbalancing torque applied to said beam by said resilient means permits displacement on said indicator means one division from said zero point on said chart.

3. A beam balance weighing scale according to claim 2, wherein the resilient means is a spring wire member.

4. A beam balance weighing scale according to claim 3, wherein said wire member is selectively replaceable and comprises one of a set of wire members having different flex characteristics, whereby the sensitivity of the scale can be changed selectively by changing the wire member employed therein.

5. A beam balance weighing scale according to claim 3, wherein said resilient wire member is in the form of a J having one long leg and one short leg and a curved portion connecting said legs, said short leg being secured to a rigid strap connected to said beam, the curved portion of said resilient member being disposed above said short leg, said long leg of said resilient member depending below the end of said short leg and being secured relative to said base.

6. A beam balance weighing scale according to claim 5, wherein a threaded adjusting shaft is journaled in a bearing on said base and the lower end of the long leg of said resilient wire member is fixedly secured to a movable member threaded on said adjusting shaft, whereby rotation of said adjusting shaft causes said moveable member and the lower end of the long leg of said resilient member to be moved parallel to the longitudinal axis of said base to alter the torque exerted by said resilient member.

References Cited

UNITED STATES PATENTS

| | | | |
|---|---|---|---|
| 363,873 | 5/1887 | Witherell | 177—229 |
| 1,243,790 | 10/1917 | Young | 177—190 |
| 1,666,314 | 4/1928 | Schaper | 177—225 XR |
| 1,682,355 | 8/1928 | Smith | 177—195 |
| 1,759,900 | 5/1930 | Hadley | 177—171 |
| 1,798,236 | 3/1931 | Walker | 177—193 |
| 1,818,285 | 8/1931 | Sundell | 177—195 |
| 2,405,619 | 8/1946 | Sutton | 177—169 |
| 2,692,772 | 10/1954 | Hadley | 177—195 XR |
| 3,015,951 | 1/1962 | Ochs | 177—225 XR |
| 3,443,653 | 5/1969 | Marshall | 177—169 XR |
| 1,746,251 | 2/1930 | Gilbert | 177—198 XR |
| 1,891,762 | 12/1932 | Hallwood | 177—197 XR |
| 1,990,265 | 2/1935 | Bryce | 177—197 XR |
| 2,074,983 | 3/1937 | Flanagan | 177—197 XR |

FOREIGN PATENTS

| | | |
|---|---|---|
| 322,109 | 11/1929 | Great Britain. |
| 74,959 | 6/1954 | Netherlands. |
| 653,512 | 5/1951 | Great Britain. |

ROBERT S. WARD, Jr., Primary Examiner

U.S. Cl. X.R.

177—171, 193, 195